Dec. 22, 1953    J. H. DAMERON    2,663,147
ROTARY PUMP AND MOTOR HYDRAULIC TRANSMISSION
Filed April 12, 1947    2 Sheets-Sheet 1
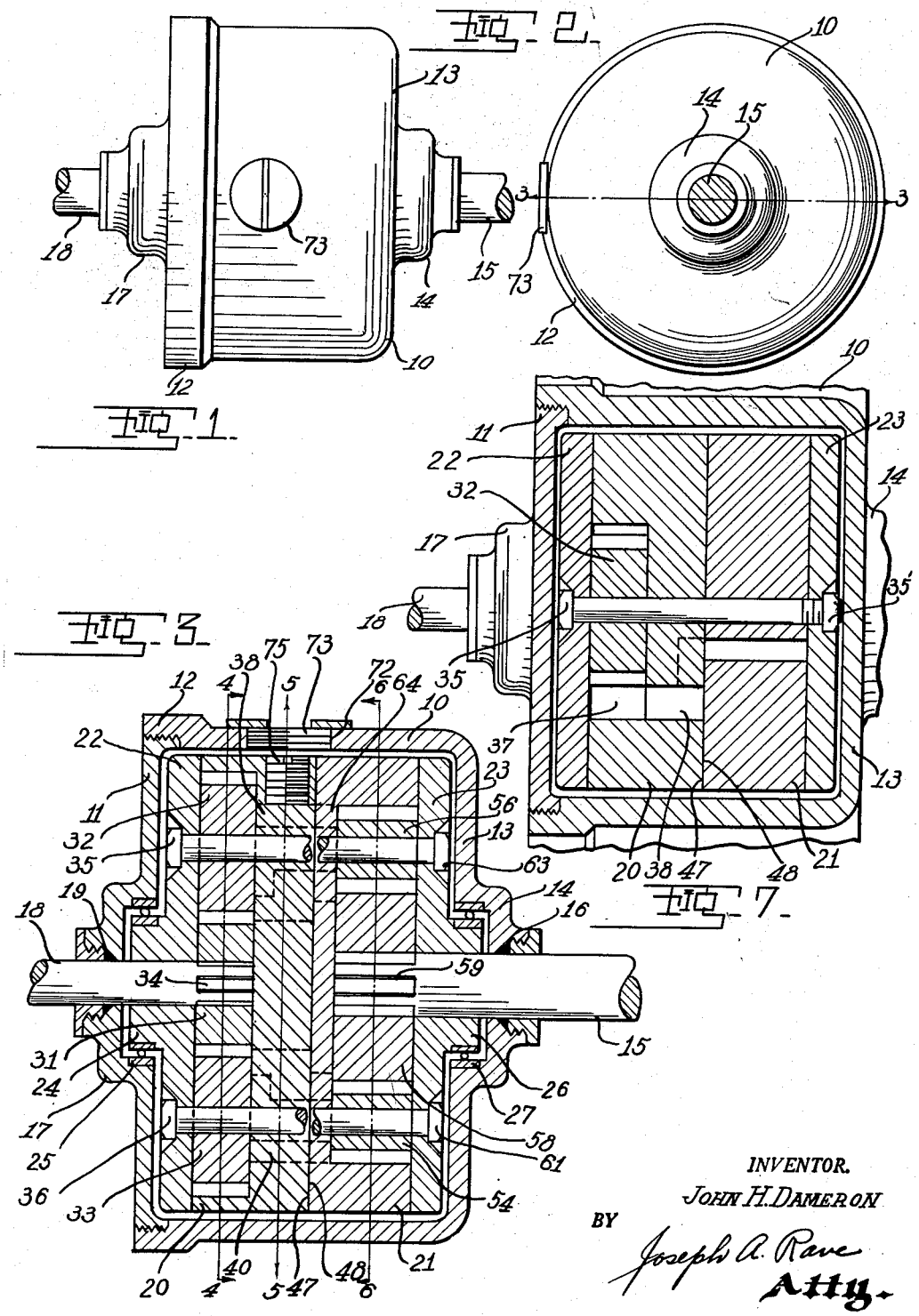
INVENTOR.
John H. Dameron
BY
Joseph A. Rave
Atty.

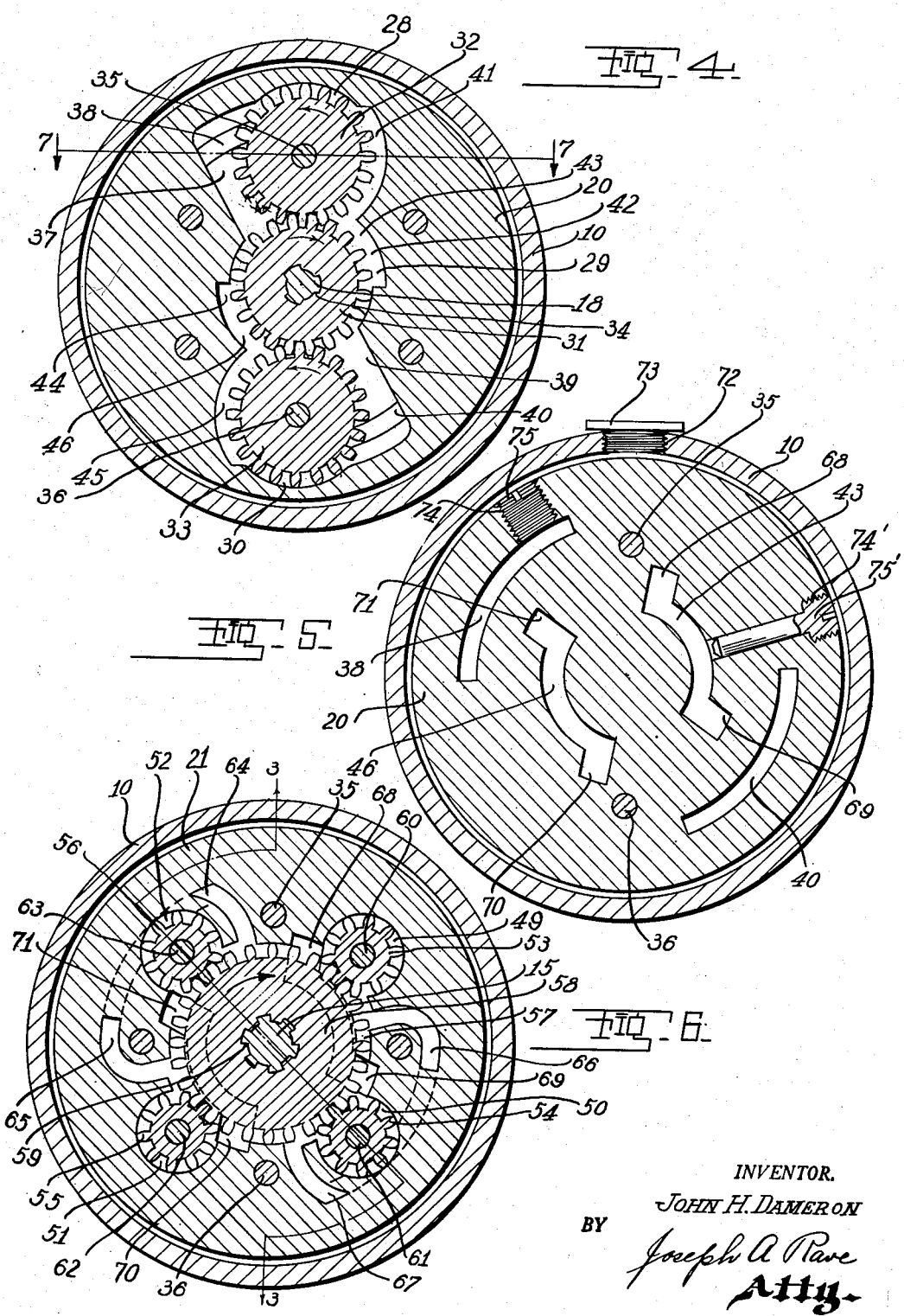

Patented Dec. 22, 1953

2,663,147

UNITED STATES PATENT OFFICE 2,663,147

ROTARY PUMP AND MOTOR HYDRAULIC TRANSMISSION

John H. Dameron, Clinton, Tenn.

Application April 12, 1947, Serial No. 741,075

9 Claims. (Cl. 60—53)

This invention relates to improvements in an hydraulic transmission.

The hydraulic transmission of the present invention is to be placed between the driving and the driven shafts for automatically compensating the difference in torque loads on the driving and driven shafts. The specific illustration in the drawing and the following detailed description is based on a construction in which a ratio of four to one exists at peak loads between the driving and driven shafts.

The principal object of the present invention is the provision of a hydraulic transmission which is of comparatively simple design yet highly efficient in operation.

Another object of the present invention is the provision of an hydraulic transmission that is automatic to compensate for differences in torque on the drive and driven shafts whereby the R. P. M. of the drive shaft being constant, the R. P. M. of the driven shaft will vary according to the load differential.

A further object of the present invention is the provision of a hydraulic transmission that is automatic in its operation of providing a variable ratio of torque delivery on the driven shaft, this being self-adjusting, or self-balancing, to adapt a suitable ratio to the demands of a varying load and may be termed a hydrostatic torque transmitter.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a side elevational view of a hydraulic transmission embodying the improvements of this invention.

Fig. 2 is an end elevational view of the device shown in Fig. 1 as seen particularly from the right hand side of said Fig. 1.

Fig. 3 is an enlarged longitudinal sectional view through the device of the present invention taken partly on line 3—3 on Fig. 2 and partly on a staggered line, likewise indicated as 3—3 on Fig. 6.

Fig. 4 is a transverse sectional view through the pump of the transmission as seen from line 4—4 on Fig. 3.

Fig. 5 is a transverse sectional view through the central portion of the device or through the pump body member as on line 5—5 on Fig. 3.

Fig. 6 is a transverse sectional view through the hydraulic motor of the transmission device as seen from line 6—6 on Fig. 3.

Fig. 7 is a transverse sectional view through the housing of the mechanism taken from the line 7—7 on Fig. 4.

Throughout the several views of the drawings similar reference characters are employed to denote the same or similar parts.

The hydraulic transmission of the present invention comprises an external housing member 10 illustrated as substantially cup-shaped in cross section having its open end closed by a closure head or plate 11 conveniently externally screw threaded for reception in an internally threaded collar 12 at the open end of the housing 10.

The housing 10 and its closure plate 11 are, in practice, adapted to be held, in any suitable or desirable manner, stationary, not shown in the drawings. The housing proper 10 is provided substantially centrally of its closed end 13 with an enlarged portion 14 centrally bored to permit passage of a shaft 15 which forms the driven shaft of the unit. The bored portion 14 is suitably packed as at 16 to prevent leakage along the shaft 15. The housing closure plate 11 is similarly provided, substantially centrally thereof, with an enlarged boss 17 likewise suitably bored to permit the passage of a shaft 18, which constitutes the driving shaft. The enlarged boss 17 has centrally thereof packing 19 to prevent leakage along the shaft 18.

Within the housing 10—11 is the transmission mechanism consisting essentially of a pump body 20 and a motor body 21 with said pump body 20 having secured thereto the pump body closure plate 22 and the motor body having secured thereto a similar motor body closure 23. The pump plate 22 is provided with an axially projecting boss 24 which is received in the inner race of an anti-friction bearing 25 that has its outer race in a counter bore formed interiorly of the housing plate 11. The motor plate 23 is similarly provided with an axially projecting boss 26 received in the inner race of an anti-friction bearing 27 the outer race of which is carried by a counter bore interiorly of the end 13 of the housing 10. As will later be made clear the pump mechanism and the motor mechanism rotate as a unit on these anti-friction bearings 25 and 27.

The pump housing 20 is provided in its one face opposed to its closure plate 22 with recesses 28, 29 and 30 in which are disposed the pump gears. The recess 29 receives the pump driving gear 31 while the recesses 28 and 30 respectively recesses 28, 29 and 30 have their respective gears receive the pump driven gears 32 and 33. The recesses 28, 29 and 30 have their respective gears 32, 31 and 33 each provided with a close fit for their perimeters thereby, as will be clear, providing a divider between the intake side and the exhaust or pressure side of the pump chambers.

The pump driving gear 31 is keyed or otherwise secured to the inner end of the driving shaft 18 and which keys are indicated as splines at 34 in Figs. 3 and 4, and wherefor the pump driving gear rotates with the driving shaft 18. The pump idler gears 32 and 33 are each, respectively, rotatably mounted on a bolt 35 and 36 which passes through aligned apertures in the pump body 20 and motor 21 and finally through apertures in the motor closure plate 23 to receive nuts, one of which, bolt 35 for example, is illustrated in Fig. 7 with its nut indicated by reference numeral 35'. In other words the pump idler gears 32 and 33 are rotated on certain of the bolts that serve the dual purpose of securing the hydraulic transmission members to one another.

The device as illustrated in the drawing contemplates the driving shaft 18 being rotated in a clockwise direction for correspondingly rotating the pump driving gear 31. This results in the pump idler gears rotating in a counterclockwise direction. On one side of the idler gear 32 the recess 28 is enlarged as at 37 to form a duct and which enlarged recess 37 terminates in a port 38 extending through the pump body 20 toward the motor body 21. It will be noted that the enlarged recess 37 has its ends defined by a portion of each recess 28 and 29 which, respectively, closely engages the periphery of the idler gear 32 and the driving gear 31. The recess 30 is provided on its opposite hand from that of recess 28, as seen in Fig. 4, with an enlarged duct portion 39 which terminates at its one end in a port 40 and which port 40 similar to the port 38 is formed through the pump body 20 toward the motor body 21. It will be noted that the enlarged recess 39, similar to the recess 37, has its ends defined by the portions of recesses 29 and 30 which closely engage their respective pump driving gear 31 and pump idler gear 33.

The pump body recesses 28 and 29 on the sides opposite of the pump idler gear 32 and pump driving gear 31 from the side in which the enlarged recess 37 is formed are likewise enlarged as at 41 and 42. These enlarged recesses 41 and 42 form the supply duct for the pump gears 31 and 32 and have connected therewith a supply port 43 which has its other end terminating in the discharge side of the hydraulic motor as will later be made clear and for which reasons the port 43 extends through the pump body 20 to the motor body. The pump body recesses 29 and 30 are likewise, on the sides of pump gears 31 and 33 opposite from the side of the enlarged recess 39, provided with enlarged ducts 44 and 45. The said ducts 44 and 45 terminate in a supply port 46 which, similar to the port 43, has its other end at the outlet of the hydraulic motor and therefore extends through the pump body 20 toward the motor body 21.

As will be seen in Fig. 3 the pump body 20 has an inner surface 47 which is in face contact with a similar inner surface 48 of the motor body 21. The motor body 21 is provided in its face opposite to its contacting face 48, see Fig. 6, with a plurality of recesses 49, 50, 51 and 52 in each of which is disposed a motor idler gear 53, 54, 55 and 56. Substantially centrally of the motor body 21 is a recess 57 which breaks into each of the recesses 49 to 52 at equally spaced points on the perimeter of the recess 57 which recess 57 receives the motor driven gear 58. The motor driven gear 58 has simultaneous meshing engagement with the motor idler gears 53 to 56 at the points where their recesses are broken into by the recess of the motor driven gear 58.

The motor driven gear 58 is suitably keyed to the inner end of the driven shaft 15 and which keying conveniently takes the form of splines 59 at the inner end of the driven shaft 15 to be received in corresponding key ways in the motor driven gear 58. The motor idler gears 53 to 56 are each, similar to the pump idler gears 32 and 33 rotatably mounted on a bolt 60, 61, 62 and 63 each of which bolts passes through aligned perforations in the motor closure plate 23 and motor body member 21 to have their threaded ends suitably screwed in threaded apertures in the pump body member 20. From this it will be seen that bolts 60 to 63, similar to the bolts 35 and 36, serve a dual purpose of supporting the motor idler gears and effect the securing of the body or housing members and closure plates of the transmission device to one another to provide a unitarily operating structure.

Formed in the motor body member 21 are a pair of ducts or ports 64 and 65 which extend through said motor body member toward the pump body member and communicate with the port 38 and the inner ends of which ports 64 and 65, respectively communicate with the motor driving gear recess at points closely adjacent the meshing of said motor driven gear 58 with motor idler gears 56 and 55. Likewise the motor body 21 is provided with a pair of ducts or ports 66 and 67 which communicate with the pump port 40. The inner ends of the said ducts or ports 66 and 67, respectively, communicate with the motor driven gear recess 57 at points adjacent the intermeshing of said motor driven gear 58 and the motor idler gears 53 and 54. By this construction the hydraulic medium under pressure flowing from the said ports 64 to 67, inclusive, acts on the teeth of the motor driven gear and the motor idler gears and tend to rotate said motor idler gears 53 to 56 which in turn drive the motor driven gear 58 in a clockwise direction and thereby rotate the driven shaft 15 in a clockwise direction and which is the direction the driving shaft 18 is being actuated.

Communicating with the motor driven gear recess 57 and each of the motor idler gear recesses 49 to 52 inclusive, are outlet ports 68, 69, 70 and 71. The outlet ports 68 and 69 respectively connect with the port 43 for thereby supplying the hydraulic medium to the pump gears 31 and 32. The outlet ports 70 and 71 of the motor likewise respectively, communicate with the inlet port 44 that supplies the hydraulic medium to the pump gears 31 and 33.

From the foregoing it will be noted that rotation of the pump gears discharges a hydraulic medium under pressure into the enlarged recesses 37 and 39 of the pump which in turn is passed through the ports 38 and 40 to, respectively, motor ports 64—65 and 66—67 for thereby rotating the motor driven gear 58. The hydraulic medium after acting on the motor driven gear 58 is discharged through the ports 68 to 71, inclusive, to the ports 43 and 46, which, through the enlarged recesses 41 and 42 and 44 and 45 supply the pump gears with the hydraulic medium to be recirculated under pressure.

From the foregoing it will be noted that the hydraulic transmission includes a completely closed circuit for a hydraulic medium and which medium should be of the non-elastic type such as oil. In order to supply the said hydraulic medium to the transmission device, the housing 10 is provided with a filler opening 72 normally closed by a plug 73. The filler opening 72 enables the housing 10 to be completely filled with the said hydraulic medium and in order to fill the various ports and ducts of the transmission mechanism the pump body 20 is provided with openings 74 and 74', respectively, normally closed by plugs or the like 75 and 75'. The opening 74 supplies the pressure side of the system while the opening 74' supplies the return side thereof.

It is believed that the normal operation of the transmission device is understood from the foregoing description. In use and as stated above the housing 10 is held stationary and acts as the support for the transmission device. In what may be termed low gear or with the greatest amount of torque on the driven shaft 15 the parts operate substantially as above set forth, namely, a motive force, such as derived from a gasoline engine, is applied to the driving shaft 18 for rotating the pump gears which cause a circulation of the hydraulic medium, under pressure, through the transmission device for in turn rotating the driven shaft. The maximum torque on the driven shaft 15 may be established in the ratio of four to one to the torque on the drive shaft as will later be made clear. With this condition the R. P. M. of the driven shaft is substantially one fourth of that of the drive shaft 18.

In order to establish this condition the following specifications for the various gears were employed:

In the pump the driving gear 31 had a radius of 1.5 inches, a face width of 1.39 inches and a whole tooth depth of .3595 inch, while each pump idler gears had a radius of 1.584 inches, a face width of 1.39 inches and a whole tooth depth of .3595 inch resulting in a pressure surface on the two pump idler gears of approximately one square inch. The motor driven gear 58 had a radius of 2.25 inches, a face width of 1.855 inches and a whole tooth depth of .3595 inch, while each of the motor idler gears had a radius of .834 inch, a face width of 1.855 inches and a whole tooth depth of .3595 inch thereby presenting a pressure surface on the four motor idler gears illustrated in the drawing of 2.6678 inches. The oil pressure developed by one horse power at 3000 R. P. M. gave 6600 inch pounds per second per 50 revolutions or 132 inch pounds per revolution which expressed in a formula reads:

$$\frac{6600 \text{ in. lbs. sec.}}{50 \text{ R. P. S.}} = 132 \text{ in. lbs.-rev.}$$

Since the pump driving gear is 3 inches in diameter it has a circumference of 9.42 inches and will therefore develop very slightly more than 14 pounds pressure per horse power per square inch, and which expressed as a formula reads:

$$\frac{132}{9.42} = 14.01 \text{ lbs. (pressure per H. P.) per sq. in.}$$

into the following form:

Since the pump driving gear has a radius of 1.5" and a total tooth surface of 1 sq. in., and has 20 gear teeth, each tooth delivered one twentieth of the total pressure developed in one revolution which results in a pressure of 4.4 lbs. per horsepower, and expressed as a formula reads:

$$\frac{132 \text{ in. lbs./rev.}}{1.5 \text{ in. (radius)}} = 88 \text{ lbs. p. s. i./rev.}$$

$$\frac{88 \text{ lbs. p. s. i./rev.}}{20 \text{ teeth}} = 4.4 \text{ lbs. p. s. i./tooth/H. P.}$$

To cause a difference in ratio between the drive and the driven shafts a greater fluid capacity is provided in the motor by having a wider gear face exposed to the hydraulic pressure and in addition to this the motor has a larger central gear than the pump, thus providing a greater leverage through its radius than the pump. To calculate the total ratio it is necessary to consider both factors, thus:

$$\frac{2.6678 (\text{sq. in.})}{1 \text{ sq. in.}} \times \frac{2.25 (\text{in.})}{1.5 (\text{in.})} = 4$$

As illustrated in the drawing the hydraulic pressure on the pump idler gears is exerted at right angles to the tooth radius on each tooth just before it emerges from its recess, as shown on Fig. 4. Since the idlers are freely rotatable on their axles this hydraulic force is also exerted as a mechanical force against the gear teeth of the driving gear, the idler axles acting as a fulcrum. The resultant of these two forces acting on the axles of the idlers is exerted on the pump assembly, the component of which forces, acting at right angles to the radius of the pump body, provides a moment which tends to rotate the pump end of the assembly in a clockwise direction.

In the motor end of the assembly a similar but opposite condition exists. The hydraulic force is exerted on each motor idler gear tooth at right angles to its gear radius as it enters its closely fitting recess 49 to 52 as shown on Fig. 6. This force results in an equal mechanical force being exerted against the teeth of the motor driven central gear. The resultant of the forces acting through the axles-fulcrums of the motor idler gears is exerted on the motor assembly, the component of which provides a moment which, acting at right angles to the radius of the motor body, tends to rotate the assembly in a counterclockwise direction. Since the pump end and motor end of the motor-pump assembly have been shown to be joined by bolts into an integral unit, it can be seen that the two moments described, acting simultaneously as a result of the same hydraulic pressure, cancel each other and cannot result in rotation of the transmission assembly as long as these two moments are equal and opposite. An analysis of the forces shows that the above moments are equal and opposite when the load is at the maximum torque that can be delivered. This results from the specific dimensions above set forth in a stationary condition of the pump-motor assembly and a power delivery of a 4 to 1 ratio resulting entirely from the pumping action of the parts. Power delivery on the motor driven gear is a result of the action on the motor idler gear teeth which receive their power from the hydraulic pressure contained in the pressure side of the circuit between the pump and the motor. This pressure is the result of the power delivered by the pump and the resistance offered through the motor. With a constant source of power, the pressure can then be said to be directly proportional to the load on the driven shaft.

The moment exerted on the motor-pump assembly by the motor idler gears through their axles in a counter-clockwise direction, is the result of the hydraulic pressure. Since the pressure is directly proportional to the load, so is the counter-clockwise force directly proportional to the load. Therefore, as the load is increased on the driven shaft, the counter-clockwise moment approaches a balance with the clockwise moment, reducing the forward or clockwise speed of the transmission assembly and thereby bringing about an increase of pumping action with an increase of torque on the driven shaft until the maximum is reached where a perfect balance of moments exists, there is no forward motion of the pump-motor assembly, and power is delivered by a full pumping action at the maximum ratio.

The foregoing dimensions and formulas are given by way of examples and are not to be construed as limiting the invention to the said exact dimensions and angles.

As the torque on the driven shaft 15 lessens the said shaft tends to speed up in R. P. M. and at the same time the torque in the motor in excess of that required to rotate the driven shaft 15 must be used or dissipated. The reverse reaction on the housing is reduced and overcome by the forward reaction. This excess torque is dissipated by reacting on the transmission members themselves thereby effecting a forward rotation and increase in R. P. M. on the driven shaft and these conditions continue until there is established a balance of torque between that applied to the driving shaft and that required to turn the driven shaft when added to that required for rotating the transmission members.

From the foregoing it will now be apparent that there has been provided a transmission mechanism that accomplishes the objects initially set forth.

What is claimed is:

1. In a hydraulic transmission the combination of a combined hydraulic pump-motor housing forming the reaction member for a hydraulic pump at one end thereof and the reaction member for a hydraulic motor at the other end thereof, said pump-motor housing including a pump expansion chamber containing a high pressure area and a low pressure area separated from one another by a driving gear and a pump idler gear, said pump-motor housing including a hydraulic motor expansion chamber containing a high pressure area and a low pressure area separated by a driven gear and a motor idler gear, said high pressure areas of the pump and motor expansion chambers being, respectively, on opposite hands of its driving and driven gears, as viewed from an end thereof, so that the reactive forces on the pump-motor housing are opposed to one another, said pump driving and idler gears being formed to dimensions different from the dimensions of the motor driven and idler gears so that there is a difference in fluid capacities of the pump and motor and a torque ratio between them greater than one to one, a driving shaft rotatably mounted in said pump-motor housing fixed to said pump driving gear, a driven shaft rotatably mounted in said pump-motor housing fixed to said motor driven gear, a closed fluid circuit between the high pressure areas of the pump and motor, a closed fluid circuit between the low pressure areas of the pump and motor, and means mounting the pump-motor housing, the drive shaft and the driven shaft for independent and unitary rotation so that said pump-motor housing may rotate as determined by the difference in reactive torque on the reactive pump-motor housing and which rotation increases in rate as the torque between the pump and motor approaches a torque ratio of one to one.

2. In a hydraulic transmission the combination of a combined hydraulic pump-motor housing forming the reaction member for a hydraulic pump at one end thereof and the reaction member for a hydraulic motor at the other end thereof, said pump-motor housing including a pump expansion chamber containing a high pressure area and a low pressure area separated from one another by a driving gear and a pump idler gear, said pump-motor housing including a hydraulic motor expansion chamber containing a high pressure area and a low pressure area separated by a driven gear and a motor idler gear, said high pressure areas of the pump and motor expansion chambers being, respectively, on opposite hands of its driving and driven gears, as viewed from an end thereof, so that the reactive forces on the pump-motor housing are opposed to one another, said pump driving and idler gears being formed to dimensions different from the dimensions of the motor driven and idler gears so that there is a difference in fluid capacities of the pump and motor and a torque ratio between them greater than one to one, a driving shaft rotatably mounted in said pump-motor housing fixed to said pump driving gear, a driven shaft rotatably mounted in said pump-motor housing fixed to said motor driven gear, a closed fluid circuit between the high pressure areas of the pump and motor, a closed fluid circuit between the low pressure areas of the pump and motor, and a stationary casing enclosing the pump-motor housing and providing bearings therefor so that said pump-motor housing may freely rotate relative thereto and relative to the driving and driven shafts as determined by the difference in reactive torque on the reactive pump-motor housing and which rotation increases in rate as the torque between the pump and motor approaches a one to one ratio.

3. In a hydraulic transmission the combination of a combined hydraulic pump-motor housing forming the reaction member for a hydraulic pump at one end thereof and the reaction member for a hydraulic motor at the other end thereof, said pump-motor housing including a pump expansion chamber containing a high pressure area and a low pressure area separated from one another by a driving gear and a pump idler gear, said pump-motor housing including a hydraulic motor expansion chamber containing a high pressure area and a low pressure area separated by a driven gear and a motor idler gear, said high pressure areas of the pump and motor expansion chambers being, respectively, on opposite hands of its driving and driven gears, as viewed from an end thereof, so that the reactive forces on the pump-motor housing are opposed to one another, said pump driving and idler gears being formed to dimensions different from the dimensions of the motor driven and idler gears so that there is a difference in fluid capacities of the pump and motor and a torque ratio between them greater than one to one, a driving shaft rotatably mounted in said pump-motor housing fixed to said pump driving gear, a driven shaft rotatably mounted in said pump-motor housing fixed to said motor driven gear, said pump-motor housing having a port formed therethrough forming a closed fluid circuit between the high pressure areas of the pump and motor, said pump-motor housing having an additional port formed therethrough forming a closed fluid circuit between the low pressure areas of the pump and motor, and means mounting the pump-motor housing, the drive shaft and the driven shaft for independent and unitary rotation so that said pump-motor housing may rotate as determined by the difference in reactive torque on the reactive pump-motor housing and which rotation increases in rate as the torque between the pump and motor approaches a torque ratio of one to one.

4. In a hydraulic transmission the combination of a combined hydraulic pump-motor housing forming the reaction member for a hydraulic pump at one end thereof and the reaction member for a hydraulic motor at the other end thereof, said pump-motor housing including a pump expansion chamber containing a high pressure area and a low pressure area separated from one another by a driving gear and a pump idler gear, said pump-motor housing including a hydraulic motor expansion chamber containing a high pressure area and a low pressure area separated by a driven gear and a motor idler gear, said high pressure areas of the pump and motor expansion chambers being, respectively, on opposite hands of its driving and driven gears, as viewed from an end thereof, so that the reactive forces on the pump-motor housing are opposed to one another, said pump driving and idler gears being formed to dimensions different from the dimensions of the motor driven and idler gears so that there is a difference in fluid capacities of the pump and motor and a torque ratio between them greater than one to one, a driving shaft rotatably mounted in said pump-motor housing fixed to said pump driving gear, a driven shaft rotatably mounted in said pump-motor housing fixed to said motor driven gear, said pump-motor housing having a port formed therethrough forming a closed fluid circuit between the high pressure areas of the pump and motor, said pump-motor housing having an additional port formed therethrough forming a closed fluid circuit between the low pressure areas of the pump and motor, and a stationary casing enclosing the pump-motor housing and providing bearings therefor so that said pump-motor housing may freely rotate relative thereto and relative to the driving and driven shafts as determined by the difference in reactive torque on the reactive pump-motor housing and which rotation increases in rate as the torque between the pump and motor approaches a one to one ratio.

5. A hydraulic transmission comprising a driving shaft and a driven shaft, a pump body member forming the reaction member for a hydraulic pump and having a recess therein for a driving gear and a plurality of pump idler gears respectively enmeshed at spaced points circumferentially on said driving gear and with said driving gear secured to the driving shaft, said enmeshed pump driving and idler gears forming in the pump body member recess on each side of each idler gear, respectively, a high pressure area and a low pressure area, a motor body member forming the reaction member for a hydraulic motor and having formed therein a recess for a driven gear and a plurality of motor idler gears respectively enmeshed at spaced points circumferentially on said driven gear and with said driven gear secured to the driven shaft, said enmeshed motor driven and idler gears forming in the motor body recess a high pressure area and a low pressure area respectively on opposite sides of each motor idler gear, said pump driving and idler gears being formed to dimensions different from the dimensions of the motor driven and idler gears so that there is a difference in fluid capacities of the pump and motor recesses and a torque ratio between the pump and motor greater than one to one, said pump body member and said motor body member being arranged in contact with one another and with a common axis, means securing the pump body member and motor body member to one another with their high pressure areas, respectively on opposite hands of its driving and driven gears, as viewed from an end thereof, so that the reactive forces on the pump body member and the motor body member are opposed to one another, a closed fluid circuit between the high pressure areas of the pump and motor, a closed fluid circuit between the low pressure areas of the pump and motor, and means mounting the connected pump and motor body members, the drive shaft and the driven shaft for independent and unitary rotation so that said connected pump and motor body members may rotate as determined by the difference in reactive torque on the pump body member and the motor body member and which rotation increases in rate as the torque between the pump and motor approaches a torque ratio of one to one.

6. A hydraulic transmission comprising a driving shaft and a driven shaft, a pump body member forming the reaction member for a hydraulic pump and having a recess therein for a driving gear and a plurality of pump idler gears respectively enmeshed at spaced points circumferentially on said driving gear and with said driving gear secured to the driving shaft, said enmeshed pump driving and idler gears forming in the pump body member recess on each side of each idler gear, respectively, a high pressure area and a low pressure area, a motor body member forming the reaction member for a hydraulic motor and having formed therein a recess for a driven gear and a plurality of motor idler gears respectively enmeshed at spaced points circumferentially on said driven gear and with said driven gear secured to the driven shaft, said enmeshed motor driven and idler gears forming in the motor body recess a high pressure area and a low pressure area, respectively, on opposite sides of each motor idler gear, said pump drive and idler gears being formed to dimensions different from the dimensions of the motor driven and idler gears so that there is a difference in fluid capacities of the pump and motor recesses and a torque ratio between the pump and motor greater than one to one, said pump body member and said motor body member being arranged in contact with one another and with a common axis, means securing the pump body member and motor body member to one another with their high pressure areas, respectively, on opposite hands of its driving and driven gears, as viewed from an end thereof, so that the reactive forces on the pump body member and the motor body member are opposed to one another, a closed fluid circuit between the high pressure areas of the pump and motor, a closed fluid circuit between the low pressure areas of the pump and motor, and a stationary casing enclosing the connected pump and motor body members and providing bearings therefor so that said connected motor and pump body members may freely rotate relative thereto and relative to the driving and driven shafts as determined by the difference in reactive torque on the pump body member and the motor body member and which rotation increases in rate as the torque between the pump and motor approaches a one to one ratio.

7. A hydraulic transmission of the class described comprising a pump body member forming the reaction member of a hydraulic pump and a motor body member forming the reaction member of a hydraulic motor, said body members being secured to one another in face contact and with a common axis, each of said pump and motor body members having a face other than that in contact, the pump body member having formed in its second face recesses for a pump driving gear and a plurality of pump idler gears respectively enmeshed at points circumferentially of the driving gear, said enmeshed pump driving and idler gears forming in each recess a high pressure area on one side of each idler gear and a low pressure area on the opposite side of each idler gear, a closure plate on the second face of the pump body member for closing the recesses, a driving shaft rotatably mounted in said pump recesses closure plate having secured thereto the pump driving gear, the motor body member having formed in its second face recesses for a motor driven gear and a plurality of motor idler gears enmeshed at points circumferentially of the motor driven gear, said enmeshed motor driven and idler gears forming in each recess on one side of each motor idler gear a high pressure area and on the opposite side of each motor idler gear a low pressure area, a motor recesses closure plate on the motor body member second face, a driven shaft rotatably supported by the motor recesses closure plate and having secured thereto the motor driven gear, said pump driving and idler gears being formed to dimensions different from the dimensions of the motor driven and idler gears so that there is a difference in fluid capacities of the pump and motor and a torque ratio between them greater than one to one, said securing of the pump body member and the motor body member being such that their high pressure areas are, respectively, on opposite hands of the driving and driven gears, as viewed from an end thereof, so that the reactive forces on the pump body member and motor body member are opposed to one another, a closed fluid circuit between the high pressure areas of the pump and motor, a closed fluid circuit between the low pressure areas of the pump and motor, and means mounting the connected pump and motor body members, the drive shaft and driven shaft for independent and unitary rotation so that said connected pump and motor body members may rotate as determined by the difference in reactive torque on the pump body member and the motor body member and which rotation increases in rate as the torque between the pump and motor approaches a torque ratio of one to one.

8. A hydraulic transmission of the class described comprising a pump body member forming the reaction member of a hydraulic pump and a motor body member forming the reaction member of a hydraulic motor, said body members being secured to one another in face contact and with a common axis, each of said pump and motor body members having a face other than that in contact, the pump body member having formed in its second face recesses for a pump driving gear and a plurality of pump idler gears respectively enmeshed at points circumferentially of the driving gear, said enmeshed pump driving and idler gears forming in each recess a high pressure area on one side of each idler gear and a low pressure area on the opposite side of each idler gear, a closure plate on the second face of the pump body member for closing the recesses, a driving shaft rotatably mounted in said pump recesses closure plate having secured thereto the pump driving gear, the motor body member having formed in its second face recesses for a motor driven gear and a plurality of motor idler gears enmeshed at points circumferentially of the motor driven gear, said enmeshed motor driven and idler gears forming in each recess on one side of each motor idler gear a high pressure area and on the opposite side of each motor idler gear a low pressure area, a motor recesses closure plate on the motor body member second face, a driven shaft rotatably supported by the motor recesses closure plate and having secured thereto the motor driven gear, said pump driving and idler gears being formed to dimensions different from the dimensions of the motor driven and idler gears so that there is a difference in fluid capacities of the pump and motor and a torque ratio between them greater than one to one, said securing of the pump body member and the motor body member being such that their high pressure areas are, respectively, on opposite hands of the driving and driven gears, as viewed from an end thereof, so that the reactive forces on the pump body member and motor body member are opposed to one another, ports formed in the pump and body members from the high pressure areas of their respective recesses through their contacting faces in alignment with one another to form a closed fluid circuit between the high pressure areas of the pump and motor, additional ports formed through said pump and motor body members from the low pressure areas of their respective recesses through the contacting faces thereof in alignment with one another to form a closed fluid circuit between the low pressure areas of the pump and motor, and means mounting the connected pump and motor body members, the drive shaft and the driven shaft for independent and unitary rotation so that said connected pump and body members may rotate as determined by the difference in reactive torque on the pump body member and the motor body member and which rotation increases in rate as the torque between the pump and motor approaches a torque ratio of one to one.

9. A hydraulic transmission of the class described comprising a pump body member forming the reaction member of a hydraulic pump and a motor body member forming the reaction member of a hydraulic motor, said body members being secured to one another in face contact and with a common axis, each of said pump and motor body members having a face other than that in contact, the pump body member having formed in its second face recess for a pump driving gear and a plurality of pump idler gears respectively enmeshed at points circumferentially of the driving gear, said enmeshed pump driving and idler gears forming in each recess a high pressure area on one side of each idler gear and a low pressure area on the opposite side of each idler gear, a closure plate on the second face of the pump body member for closing the recesses, a driving shaft rotatably mounted in said pump recesses closure plate having secured thereto the pump driving gear, the motor body member having formed in its second face recesses for a motor driven gear and a plurality of motor idler gears enmeshed at points circumferentially of the motor driven gear, said enmeshed motor driven and idler gears forming on one side of each motor idler gear a high pressure area and on the opposite side of each motor idler gear a low pressure area, a motor recesses closure plate on the motor body member second face, a driven shaft rotatably supported by the motor recesses closure plate and having secured thereto the motor driven gear, said pump driving and idler gears being formed to dimensions different from the dimensions of the motor driven and idler gears so that there is a difference in fluid capacities of the pump and motor and a torque ratio between them greater than one to one, said securing of the pump body member and the motor body member being such that their high pressure areas are, respectively, on opposite hands of the driving and driven gears, as viewed from an end thereof, so that the reactive forces on the pump body member and motor body member are opposed to one another, ports formed in the pump and body members from the high pressure areas of their respective recesses through their contacting faces in alignment with one another to form a closed fluid circuit between the high pressure areas of the pump and motor, additional ports formed through said pump and motor body members from the low pressure areas of their respective recesses through the contacting faces thereof in alignment with one another to form a closed fluid circuit between the low pressure areas of the pump and motor, a bearing boss outwardly projecting from each of the pump body member recesses and motor body member recesses closure plates, and a stationary casing enclosing the connected pump and motor body members and providing bearings for their closure plates bearing bosses so that said connected pump and motor body members may freely rotate relative thereto and relative to the driving and driven shafts as determined by the difference in reactive torque on the pump body member and the motor body member and which rotation increases in rate as the torque between the pump and motor approaches a one to one ratio.

JOHN H. DAMERON.

References Cited in the file of this patent
UNITED STATES PATENTS

| Number | Name | Date |
|---|---|---|
| 1,080,282 | Kellogg | Dec. 2, 1913 |
| 1,243,640 | Story | Oct. 16, 1917 |
| 1,647,621 | Hawley | Nov. 1, 1927 |
| 1,914,622 | Smith | June 20, 1933 |
| 1,998,922 | Chamberlain et al. | Apr. 23, 1935 |
| 2,198,891 | Thoma | Apr. 30, 1940 |
| 2,323,926 | McGill | July 13, 1943 |